United States Patent [19]

Saulsbury

[11] 4,335,609

[45] Jun. 22, 1982

[54] MEASURING CUP

[76] Inventor: Carol A. Saulsbury, 700 NE. 80th Ter., Kansas City, Mo. 64118

[21] Appl. No.: 201,090

[22] Filed: Oct. 27, 1980

[51] Int. Cl.³ .......................................... G01F 19/00
[52] U.S. Cl. ..................................... 73/426; 222/386
[58] Field of Search ................. 73/426, 427, 428, 429; 222/386

[56] References Cited

U.S. PATENT DOCUMENTS 1,706,582 3/1929 Merrill .................................. 73/429
2,329,437 9/1943 Corwin ................................. 73/427

Primary Examiner—S. Clement Swisher
Attorney, Agent, or Firm—Thomas M. Scofield

[57] ABSTRACT

Improvements in measuring cups used in kitchens to receive and accurately measure quantities of foodstuffs; improvements in foodstuff measuring cups which enable the accumulation, compacting and measuring of precise amounts of usually difficultly measured materials such as ice cream, cottage cheese, crushed and drained fruits and the like; an insert base and a compacting top member useable with a food stuff measuring cup to receive, compact or level and measure foodstuffs of various sorts and, thereafter, remove the measured quantity of foodstuff from the measuring cup or vessel; devices for precisely measuring nonlevel seeking foodstuffs of all sorts in a conventional measuring cup, which devices receive, compact or level and aid in controlled removal of the measured foodstuffs with respect to the measuring cup.

18 Claims, 8 Drawing Figures

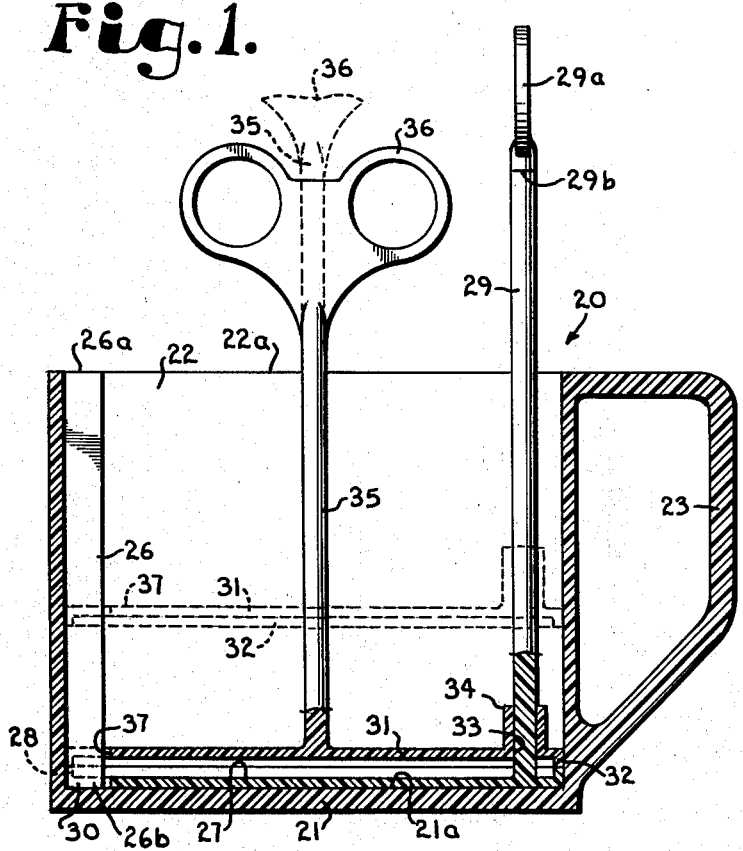
Fig.1.
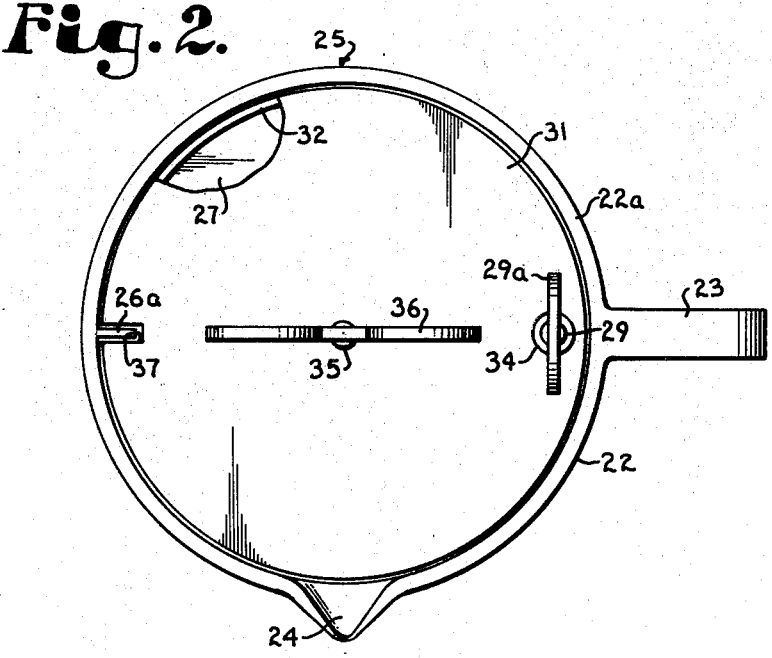
Fig.2.
Fig.3.

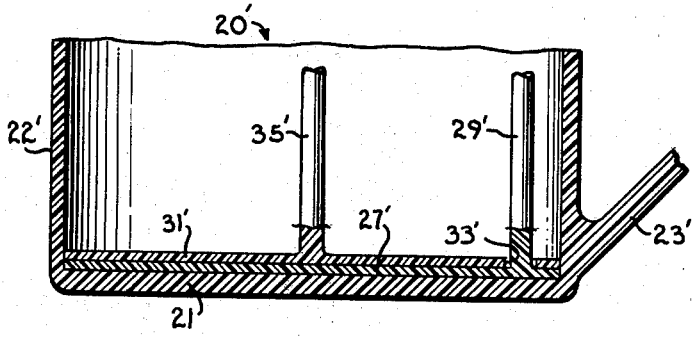
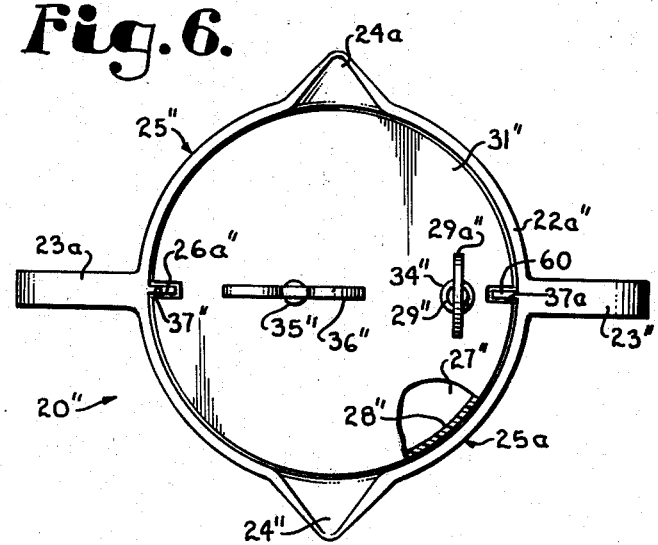
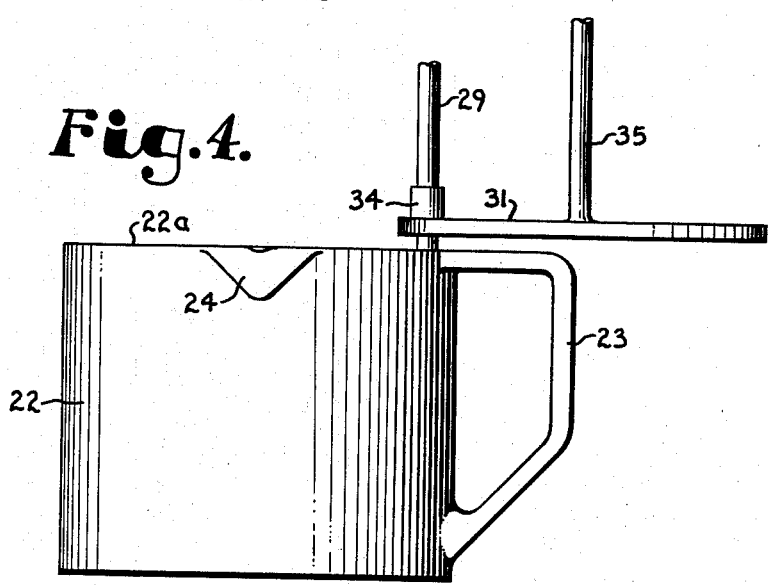
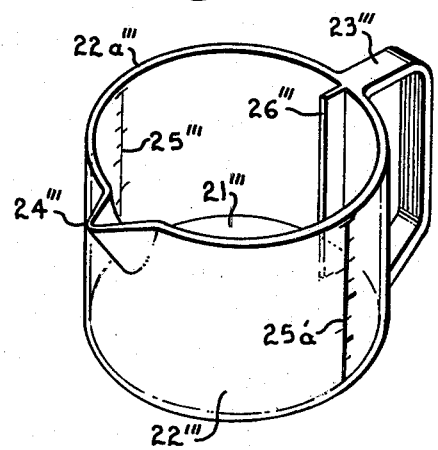
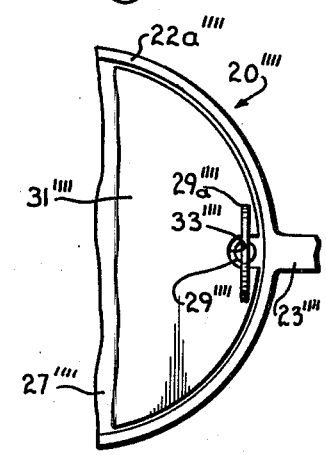

MEASURING CUP

BACKGROUND OF THE INVENTION

Measuring cups for foodstuffs are well known to the art. Conventionally, such are available in one cup and two cup sizes, sometimes larger. A typical, conventional measuring cup will be of translucent or preferably transparent material (at least in one vertical side portion of the wall), there being provided measuring indicia as to quantity on one or two portions of the side wall. In the latter case, the indicia are typically 180° opposed to one another on a cylindrical side wall. One or more grasping handles may be provided and one or more pouring spouts, as well.

Cooks and housewives are well aware of certain problems with respect to measuring particular types of foodstuffs which are not self leveling. Additionally, the measurements or quantities required by a recipe may call for the material or substance required "compacted". Typical materials which are not self leveling and which represent a measuring and/or compacting problem to a housewife or cook include (without limitation) ice cream, jelly, mayonnaise, pumpkin, coconut, cottage cheese, avocado, crushed and drained fruits and vegetables, shortening, brown sugar, butter, softened oleos and the like.

Recognizing the problem of compacting and leveling, certain measuring containers, including measuring cups and the like, have included compacting tops or plungers associated to a greater or lesser degree with the measuring container. These plungers, caps or tops, although sometimes excessively complex or expensive, will adequately perform the job of leveling, compacting, crushing or the like, thus to provide a proper and adequate compacting action and/or an accurate measure, with or without compacting. However, these conventional additive devices to measuring containers or cups create an additional new problem, specifically, removing the measured and/or crushed or compacted foodstuff or foodstuffs from the measuring containers. Particularly this may be the case when the compacting cap or plunger is a part of the container. That is, gummy or adherent substances, after leveling, compacting or crushing, are particularly difficult to fully clear or remove from the container sides and bottom wall.

It is the solution of the problem of adequate measuring and/or compacting, together with the solution of the problem of handling and removing of the type of foodstuffs in question which is the subject of this invention.

OBJECTS OF THE INVENTION

The first object of the invention is to provide improvements in measuring cups which are adapted to deal with foodstuffs which require leveling, compacting or compressing for use of the foodstuffs and/or adequate measure thereof.

Another object of the invention is to provide improvements in devices for receiving, leveling, compacting and compressing (if necessary) foodstuffs within a measuring cup and, additionally, removing the measured and/or leveled, compacted foodstuffs from the measuring container thereafter.

Another object of the invention is to provide simple, rugged, relatively inexpensive and effectively and efficiently operable means associated with a measuring container or cup which will receive food stuffs difficult to measure, prepare them for measuring and measure same and, further, readily effect and permit removal of the foodstuffs from the measuring container without mess or loss.

Another object of the invention is to provide improved measuring cup constructions having associated therewith devices for receiving, leveling, compacting and handling foodstuffs normally difficult to handle and measure, all with great ease and effectiveness.

A further object of the invention is to provide a measuring cup or measuring container having associated therewith a leveling and/or compacting plunger adapted to aid in the handling of difficulty measurable foodstuffs or related materials, there being additionally provided an opposed, linked insert base for the measuring container between which the material or stuff to be measured is received.

Another object of the invention is to provide opposed insert members for a measuring vessel or cup which are so linked with one another and the cup structure that difficult to measure foodstuffs or materials and the like requiring leveling and/or compacting are received therebetween, held therebetween and then removed from the measuring vessel therebetween, thus greatly simplifying all the operations of insertion, leveling, compacting, measuring and removing usually associated with conventional measuring cups and such materials.

Yet another object of the invention is to provide improvements in measuring cups and containers where difficult to handle materials, foodstuffs and the like may be received in the measuring vessel, leveled, compacted if necessary, measured and removed therefrom with no more effort or trouble than easily handled materials.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIGS. 1-4, inclusive are directed to a preferred form of the subject invention.

FIG. 1 is a side, sectional view of the preferred form of the invention with the device shown in full lines with the compacting plunger disc adjacent the bottom of the measuring vessel in registration with the insert base disc and, in dotted lines, with the compacting plunger disc raised away therefrom.

FIG. 2 is a plan view, from above, of the device of FIG. 1 with the parts in the full line position of FIG. 1. A portion of the upper compacting disc is cut away to show the depending flange thereon.

FIG. 3 is a three-quarter perspective, exploded view from above of the device of FIGS. 1 and 2 showing a compacted mass of foods, such as cottage cheese, being lifted from the measuring cup while held between the upper and lower base and compacting discs.

FIG. 4 is a fragmentary side view, from the spout side (looking up from below in the view of FIG. 2) of the device of FIGS. 1-3, inclusive with the compacting disc pivoted from over the top of the cup to over the handle for filling purposes.

FIG. 5 is a fragmentary side section through a second form of the invention.

FIG. 6 is a vertical plan view, from above, of a third form of the subject invention.

FIG. 7 is a three quarter perspective view, from above, of the measuring cup for a fourth form of the invention.

FIG. 8 is a fragmentary plan view, from above, of a portion of a fifth form of the invention.

FIGS. 1-4, INCLUSIVE

These figures show a preferred form of the subject inventive improved measuring cup. Referring to these views, at 20 is generally indicated a cylindrical (circular horizontal section) cup having a circular bottom wall 21 with flat, normally horizontal, upper interior surface 21a and a normally vertical cylindrical side wall 22 having an upper edge 22a. Optionally, but preferably, connected to side wall 22 is grasping handle 23. Ninety degrees displaced therefrom is pouring spout 24. One hundred eighty degrees opposed to pouring spout 24 and ninety degrees in the opposite direction from handle 23 are preferably placed measuring indicia 25 of the type seen in FIG. 7, but not seen in any of the views of FIGS. 1-4, inclusive. The material of cup 20 is preferably transparent (and at least translucent) so the measuring indicia may be seen therethrough.

The cup construction previously described is essentially conventional and may be made of plastic, optimally, glass or other suitable material. To a certain extent, the preferred true cylindrical internal cavity of the cup may diverge upwardly, but to the greater extent it does, the lesser utility the subject invention will have therewith.

Turning to the subject improvement, an optional, but preferred elongate, normally vertical flange 26 extends, preferably, the entire height of the interior of cup 20. Flange 26 preferably, as shown, is 180° opposed to grasping handle 23. The flange 26 is preferably formed integral with cup 20, when present.

It should be understood that the subject measuring cup may be circular in horizontal section, oval, square, hexagonal, etc., if desired. However, the most utilitarian form is the circular horizontal section construction shown (cylindrical cup). In the event that the horizontal sectional form of cup 20 is not circular, the shapes of the base insert disc and compacting top member disc associated therewith (to be described) will be congruent with horizontal sectional shape of cup 20.

Insert base 27, in the construction shown, is circular in plan view and has an outer diameter slightly less than the internal diameter of wall 22 of cup 20, whereby to slideably fit downwardly therewithin. Normally horizontal disc 27 preferably, but optionally, has upwardly extending peripheral flange 28 of a height optionally about a quarter of an inch as shown, but, further optionally, higher. An elongate, normally vertical rod or shaft 29 has grasping means 29a at the top thereof and preferably is of a length substantially greater than the depth of cup 20. Rod or shaft 29 is preferably positioned adjacent the periphery of disc 27, as seen. A slot 30 is provided to engage flange 26, in the event that the said flange is present in cup 20. When flange 26 is present, slot 30 is preferably provided 180° opposed to rod or handle 29. Where disc 27 has a close sliding fit inside wall 22 and flange 28 is present, preferably of relatively greater height, the presence of flange 26 is less necessary (for guiding and leveling disc 27).

Normally horizontal top compacting disc or member 31 is next provided optionally, but preferably, having downwardly depending, normally vertical peripheral flange 32 thereon. Circular disc 31 has opening 33 therethrough to slideably pass handle rod 29 therethrough and, optionally but preferably, sleeve 34 extending upwardly to slideably embrace rod 29 thereon. The purpose of sleeve 34 is to maintain disc 31 in parallel orientation with disc 27. In the event that flange 26 is present in cup 20, slot 37 is provided in the edge thereof, opposite sleeve 34. Grasping means 36 on rod 35 makes an upper disc handle atop rod 35 as grasping means 29a does on rod 29. Handle 35, 36 is preferably of a length at least somewhat greater than the depth of cup 20, but is not necessarily that long.

Top 29a may be threaded into rod 29 as at 29b. Alternatively, rod 29 may not have top 29a. In either case described, disc 31 is then removable from rod 29 at the top thereof.

FIGS. 1-4, INCLUSIVE OPERATION

Assuming that flange 26 is present in cup 20, insert base disc 27 is engaged by slot 30 with flange 26 and moved downwardly, like a piston, to abutment with upper surface 21a of cup bottom wall 21. The outer diameter of disc 27 being, preferably, a frictional but sliding fit in cup 20, the upper surface of disc 27a becomes the bottom of the cup. Disc 27 is preferably of minimum thickness compatible with the desired substantial rigidity thereof in order to minimize differences in measurements between cup 20 without the insert discs used therewith and cup 20 with same. The indicia of measurement at zone 25 of the cup may read accurately for the cup without insert disc 27, and its attachments or, alternatively, correctly for the presence of such elements in the cup. Where two sets of indicia are provided, as in FIG. 7, the correction may be made between the two sets of indicia, one to read for the cup, per se, the other to read with the inserts therein. In any case, the change with respect to measurements, either plus or minus, are relatively minimum with respect to a two cup volume.

FIGS. 1-4, inclusive, as opposed to FIG. 8, show a substantially "permanent" engagement of disc 31 with disc 27 via opening 33 and sleeve 34. However, in order to permit the initial installation of sleeve 34 on rod 29, members 29 and 29a may be threadable with one another with a joint at 29b. Alternatively, the grasping element 29a may be connected to rod 29 after the engagement. Yet further alternatively, grasping element 29a may not be provided, merely an elongate grasping handle 29 on which the disc 31, via opening 33 and sleeve 34, may be applied and removed as desired. Yet alternatively, neither rod actually requires a grasping element (as at 29 or 36) for operability.

At any rate, once disc 31 is engaged with rod 29, it is further engaged with flange 26 (if present) by slot 37. This engagement is made either after filling or for an alternative purpose such as storage of the discs and their assemblage within the cup after use or for transport or the like. In the event that a recipe portion or material portion is to be measured within the cup, in order to fill the cup to the desired level over disc 27 conveniently, disc 31 is swiveled away from the top of the cup to the degree desired, the greatest clearance being seen in FIG. 4 when disc 31 is swung around shaft 29 180° from its normal engagement position. The substance to be measured is then poured, dropped, scooped or otherwise placed into cup 20 downwardly onto the top of disc 27. Once a first estimated quantity is placed within the cup on disc 27, disc 31 is then swiveled around its pivot on rod 29 and moved downwardly in the cup (dotted lines of FIG. 1) along its engagement with flange 26, if the latter is present. Disc 31 is moved downwardly by the operator grasping handle 35, 36 into contact with the material to be measured. The latter is then leveled and/or compacted to the degree desired and it is determined if a sufficient, excess or insufficient quantity is present in the measuring cup. If insufficient or excess, disc 31 is drawn out of the cup and material added or substracted. Once the next estimated quantity of material is subtracted or added, the disc 31 is again rotated around pivot 29 to overlie and be insertible into cup 20. It then again levels and/or compacts the material within the cup and a further reading taken. This process continues until the operator is satisfied with the measure of material in the cup.

At this point, the operator has the option of lifting out the mass of measured material between the discs 27 and 31 (FIG. 3) or again removing disc 31 from the cup and swiveling or pivoting it out of the way of the top of the vessel as in FIG. 4. This decision is made by the operator according to the type of material in the cup, how far it has to be moved from the cup, the vessel receiving it, etc. In the event a plug, as it were, of material is desired to be removed between the discs, the operator may holds disc 31 down against the material 38 with one hand and grasp handle 29, 29a with the other. Alternatively, once disc 31 is placed on top of the material or engaged therewith with whatever force is desired, the operator may grasp the outside of wall 22 with one hand and lift up handle 29 with the other hand to aid in freeing the lower disc from the bottom of the cup and raising the entire array up inside the cup and out thereof as is seen in FIG. 3. A skilled user or operator may grasp both handles with the fingers and palm of one hand, maintaining the discs in compression on the material and have the other hand free to hold or move the cup as desired.

In the measuring, leveling, tamping, etc. process involving addition and/or subtraction of quantities of substance or material being measured, the case of viscous or sticky materials, there may be problem of maintaining the bottom disc 27 in the bottom of the cup and/or disengaging the top disc 31 from the material (and vice versa in the latter case). The former may be handled, if it is a problem, by holding the cup and bottom disc down by exerting downward pressure on rod 29 while lifting up on handle 35, 36. Once disc 31 is lifted clear of top edge 22a of wall 22, some material may have to be scraped off the underside of disc 31 and removed or added back to the pack in the cup to minimize measuring errors.

At any rate, it can be seen that the following features are the case:

(1) Disc 27 is first emplaced at the bottom of cup 20 and materials to be measured and/or compacted placed thereon.

(2) After the materials are added to the cup on top of disc 27, disc 31 is rotated into alignment with the cup inner volume and, pistonlike, moved down rod 29 and within the cup until it contacts the material, which is then leveled and/or compacted.

(3) After getting an initial measuring indication, if this is not correct, materials may be readily added or subtracted sequentially by moving disc 31 up and out of the container. Disc 31 may not have to be returned to the container, unless desired, if the initial measure is fairly close and only little needs to be added or subtracted.

(4) In addition to being a leveler and/or tamper, disc 31 also is useable as a grasping member to retain a quantity of relatively shape retaining material between the discs for lifting out of the measuring cup and transportation to another vessel or location.

In the event that flange 26 is not present, slots 30 and 37 are also not present and thus there is a more complete seal between the disc with respect to below, above and around them. There are borderline materials which make the use of the subject engaged discs utilitarian in certain modes and not utilitarian in other modes or application. Easily poured and levelable or self leveling materials, naturally, such as sugar and pourable liquids, and measurable and handleable without the subject improvement with utility. It is those materials which are not easily levelable, self-leveling, measurable or handleable with respect to a measuring cup which call for the use of the subject improvement.

FIG. 5

This figure shows a variation of the invention where no flange 26 is present (whereby the insert discs go into the measuring cup readily, without any fixed orientation with respect to a handle, pouring spout, measuring indicia or the like) and the opposed flanges (28 and 32 of FIGS. 1-4, inclusive) are not present. This, then, is a very simple form of the subject improvement.

In this particular figure, parts the same as those in FIGS. 1-4, inclusive are numbered the same, but primed. This being the case, the basic structure of the cup and the discs will not be redescribed in detail.

In this figure, it may be seen that the bottom disc 27' rests on the upper surface of bottom wall 21'. The upper disc 31' is slidingly engaged with handle 29' of disc 27', there not being present sleeve 34 or its equivalent of the previous figures. A portion of handle 35' is seen on disc 31'.

In operation of the device of FIG. 5, the operator places disc 27' within cup 20', atop the bottom wall 21' thereof. Disc at this time is engaged or engagable with shaft 29' of the base disc 27 and is typically first held in the position of FIG. 4 for filling. Once the cup is filled on top of disc 27 to the desired first estimated level, upper disc 31' is moved downwardly into contact therewith for leveling, compacting, measuring, etc. Adjustment of quantity is made as previously described. Operation and function is the same as described with respect to FIGS. 1-4. The absence of flanges 28 and 32 in any degree, while making the device cheaper to manufacture, permit less retention of materials in the manner or showing of FIG. 3. The showing of FIG. 5 is actually the showing of the discs and their attachments in the measuring cup when they would be in storage or transportation position.

FIG. 6

In FIG. 6, parts which are the same or serve the same purpose as parts in FIGS. 1-4, inclusive are numbered the same but double primed.

The purpose of this figure is to illustrate a modified form of measuring cup device which differs from the device seen in FIGS. 1-4, inclusive by the following:

(1) There are two grasping handles on the cup 20" (numerals for like parts to FIGS. 1-4, inclusive are the same but double primed) here designated 23" and 23a;

(2) There are two pouring spouts 180° opposed from one another, here designated 24" and 24a, the same 90° away from the 180° opposed grasping handles just noted;

(3) There are provided two vertical flanges 26" and 60, same 180° opposed from one another, these flanges engaged by suitable slots such as slots 37" and 37a in disc 31" and the other disc 27";

(4) The grasping handles 29", 29a" and 35" and 36" are somewhat smaller in overall size and the former moved a little more centrally to clear flange 60;

(5) Two sets of indicia are shown at 25" and 25a 180° opposed from one another, although there may be four sets of indicia between the handles and the pouring spouts, and the two sets of indicia, if such are employed, may be positioned as desired on the walls of the vessel between the handles and pouring spout.

This figure, as previously described, is a vertical plan view, from above, and shows the two discs (the lower one is not visible save in the cut-out in the upper left portion of the view) in the position of FIG. 1, specifically, within the measuring cup 20". It is evident from this view that one or more grasping handles, one or more pouring spouts, one or more flanges and one or more sets of indicia may be provided, as desired. Additionally, the flanges 26" and 60 may be entirely missing or one present. Yet further, with respect to the discs 27" and 31" of this view, the opposed flanges (such as 28 and 32 of FIGS. 1-4, inclusive) may both be present, only one of them, or neither or them, in the manner of FIG. 5.

The operation of the device of FIG. 6 is the same as that of FIGS. 1-4, inclusive, with disc 31 being raised upwardly on rod or shaft 29" and moved out of the way in the manner of FIG. 4 or downwardly within the cup to level, tamp, etc. as required. Another option, not illustrated, would be the provision of flanges 26" and 60 of different widths and/or lengths with the slots in the discs 27" and 31" sized to match to require a certain orientation of the discs with respect to one another and the cup before engagement could be effected with the flanges.

FIG. 7

The purpose of FIG. 7 is to show the reorientation of the elements of grasping handle on the cup, flange within the cup, indicia or multiple indicia and pouring spout with respect to one another. In this view, although the particular elements have been rearranged with respect to one another or around the cup, the numerals for the various parts, the parts being quite clearly distinguishable, one from the other, are numbered the same as in FIGS. 1-4 (and 5 and 6) but triple primed, except with respect to the second indication of measuring indicia which is numbered 25a' with respect to the second indicia 25a of FIG. 6.

In this showing, the handle and pouring spout are 180° opposed to one another. In order not to obstruct the pouring spout, flange 26''' is placed next handle 23''' and opposite pouring spout 24'''. The measuring indicia 25''' and 25a'are positioned 180° opposed to one another and 90° away from each of the pouring spout, flange and grasping handle. In this form, the assembly of insert elements could be identical to that seen in FIGS. 1-4, inclusive (if desired) with slots 30 and 37 of discs 27 and 31 engaging flange 26'. Flange 26''' and the slots would not necessarily have to be present for operability.

FIG. 8

In FIG. 8, like parts to those seen in FIGS. 1-4, inclusive are numbered the same, but quadruple primed.

This figure shows an identical construction to that of FIGS. 1-4, inclusive with the following exceptions:

(1) Opening 33 in disc 31 of FIG. 1 is moved peripherally to become a slot or recess 33'''' in disc 31'''';

(2) There is no sleeve 34; and (3) Handle 29, 29a of FIGS. 1-4, inclusive is moved more peripherally (if desired) to minimize length of the slot 33'''', here seen as handle 29'''' and 29a''''.

The purpose of this construction is to make unnecessary the actual engagement of disc 31 by opening 33 with shaft 29, while providing the desired leveling and compacting or tamping action from the top disc. With the slot construction of FIG. 8, rather than the encircling opening and sleeve construction of FIGS. 1-4, inclusive, the pivoting action of FIG. 4 to clear the disc 31 from the top of the measuring cup when the bottom disc 27 is therein is not necessary. Thus, when disc 31'''' is lifted above top edge 22a'''' of cup 20'''', the disc 31'''' may be moved away from the cup as desired. This gives, also, immediate and ready access to the underside of the top disc for cleaning of material that may have been adhered thereto.

The drawback of the construction of FIG. 8 is that the upper disc is not self paralleling with the lower disc as is provided by sleeve 34 of FIGS. 1-4, inclusive. The operator must achieve this by adjustment of disc 31'''' within the cup by means of its handle, not seen. This handle would be, preferably, oriented and attached as handle 35, 36 of FIGS. 1-4, inclusive.

GENERAL CONCLUSIONS

Thus it may be seen that the provisions of the base insert disc and upper compacting disc, with the latter's removablity (FIG. 8) or pivoting capacity (earlier figures) provides fast and efficient means to receive, fill, level, tamp, compact, measure and empty ingredients or materials from the cup or measuring container. It may be readily seen that this device may be quickly adapted to handling, measuring, etc. foodstuffs in a kitchen, but also may be applicable on a larger scale to other materials of many and the most varied types.

As has been described, the operator may, after measuring, lift a compacted mass of food or material from the cup held between the upper and lower dis for easy removal. However, this is optional, and it may be much quicker and handier to pour the materials in on the lower disc, level, compact and achieve measure with the upper disc, then either remove the upper disc from the container entirely (FIG. 8) or pivot it out of position for removal or pouring out of the foodstuff or material. The cup interior flange or flanges serve primarily as disc guides, leveling and locating means.

The device provides a fast and efficient means of measuring and emptying those dry ingredients which need to be measured in a packed state, for example, brown sugar. It also provides a fast and efficient means of measuring soft, semi-soft or sticky ingredients which are otherwise hard to level and/or compact and/or measure. These include shortening, oleomargarines, butter, cream cheese, cottage cheese, whipped cream, mayonnaise, jelly, ice cream, peanut butter, mashed potatoes, fruits, vegetables, ground meats or the like.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A self-clearing measuring cup comprising, in combination:
   a cup having a flat, normally horizontal, bottom wall and an upright, normally vertical side wall continuously connected to said bottom wall and its lower edge,
   an insert base for the cup having a flat, normally horizontal bottom wall of slightly lesser outer diameter than the internal diameter of the cup side wall and congruent in shape to the cup interior bottom wall, whereby to readily fit down within said cup and rest on the bottom wall and be movable up and down within said cup,
   said base having upper and lower sides thereto,
   an elongate, normally vertical, base handle connected at its lower end to the upper side of said insert base and extending upwardly at right angles thereto,
   said base handle of a height at least equal to the interior depth of the cup,
   a flat, normally horizontal compacting top member slidably engageable with the said base handle by an opening therein,
   said top member congruent in form to the shape of the cup interior bottom wall and insert base and substantially equal in size to the latter,
   said compacting top member having upper and lower sides thereto,
   an elongate top member handle connected to the upper side of said top member at its lower end and extending upwardly at right angles thereto, said handle of a height equal to at least a substantial fraction of the interior depth of said cup,
   the base handle and the compacting top member handle connected to different areas of the respective base and member so that the compacting top member may be reciprocated within the cup on the base handle.

2. A measuring cup as in claim 1 including a normally vertical peripheral flange on the upper side edge of the insert base.

3. A measuring cup as in claim 1 including a normally vertical peripheral flange on the lower side edge of the compacting top member.

4. A measuring cup as in claim 1 including a normally vertical peripheral flange on each of the upper side edge of the insert base and the lower side edge of the compacting top member.

5. A measuring cup as in claim 1 including means for engaging the periphery of each of the insert base and top member and guiding them in up and down movement within the cup.

6. A cup as in claim 5, wherein said engaging means comprises an elongate, normally vertical flange on the inside wall surface of the cup side wall, there being a slot in the side edges of the insert base and top member to permit the base and member to move up and down in the cup with the flange in the said slots.

7. A cup as in claim 6 wherein the flange extends from the base of the cup side wall to adjacent its top edge.

8. A cup as in claim 1 wherein the side wall of the cup is substantially transparent in at least one vertical portion thereof and measuring indicia are provided on said one vertical portion of said side wall.

9. A cup as in claim 1 wherein the side wall of the cup is substantially transparent in the entirety thereof and measuring initia are provided on one vertical porton of said side wall.

10. A cup as in claim 1 wherein the base handle is positioned substantially to one side of center of the insert base.

11. A cup as in claim 10 wherein the compacting top member handle is positioned substantially more to the center thereof than the base handle is on the insert base.

12. A cup as in claim 1 wherein the base handle is positioned substantially to one side of center of the insert base and the opening in the compacting top member is at the side edge thereof and opening out of the side edge so that the compacting top member may be readily engaged and disengaged with said base handle with respect to said cup.

13. A cup as in claim 1 wherein the base handle is positioned substantially to one side of center of the insert base and the opening in the contacting top member is near the side edge thereof, but closed and not opening out of the side edge thereof, whereby portions of the contacting top member encircle the base handle and the contacting top member may be rotated around said base handle to substantially clear the cup top end for filling.

14. A cup as in claim 1 wherein the length of the base handle exceeds the cup depth and the length of the top member handle is at least substantially equal to the cup depth.

15. A cup as in claim 14 including grasping means at the top ends of the two said handles.

16. A cup as in claim 1 including a sleeve on the upper surface of the contacting top member encircling said base handle.

17. A cup as in claim 1 including a grasping handle on the outer surface of the cup side wall, the cup side wall being substantially cylindrical and a pouring spout on the upper end of the side wall, said handle and said spout at least 90° separated from one another.

18. A cup as in claim 1 wherein the cup side wall is substantially cylindrical and the cup bottom inside wall, the insert base and the compacting top member are substantially circular.

* * * * *